United States Patent
Defant et al.

(10) Patent No.: US 7,205,890 B2
(45) Date of Patent: Apr. 17, 2007

(54) SYSTEM, METHOD AND APPARATUS FOR LOCATING AND CONTROLLING OBJECTS

(75) Inventors: John C. Defant, Palm Harbor, FL (US); David S. Segal, Palm Harbor, FL (US)

(73) Assignee: Pro Tech Monitoring, Inc., Odessa, FL (US)

( * ) Notice: Subject to any disclaimer, the term of this patent is extended or adjusted under 35 U.S.C. 154(b) by 207 days.

(21) Appl. No.: 11/131,075

(22) Filed: May 17, 2005

(65) Prior Publication Data
US 2006/0261940 A1 Nov. 23, 2006

(51) Int. Cl.
G08B 1/08 (2006.01)
H04Q 7/00 (2006.01)

(52) U.S. Cl. ............... 340/539.13; 340/539.11; 340/825.49; 455/414.2; 455/456.2

(58) Field of Classification Search ........... 340/539.13, 340/539.1, 539.11, 691.6, 5.61, 825.49, 573.4, 340/573.1, 426.19, 988, 991, 825.36; 455/456.2, 455/404.2, 414.2
See application file for complete search history.

(56) References Cited

U.S. PATENT DOCUMENTS

| | | | |
|---|---|---|---|
| 5,327,144 A | 7/1994 | Stilp et al. | |
| 5,608,410 A | 3/1997 | Stilp et al. | |
| 6,172,640 B1 * | 1/2001 | Durst et al. | 342/357.07 |
| 6,388,618 B1 | 5/2002 | Stilp et al. | |
| 6,441,778 B1 | 8/2002 | Durst et al. | |
| 6,628,232 B1 | 9/2003 | Hynes et al. | |
| 6,700,533 B1 | 3/2004 | Werb et al. | |
| 6,801,853 B2 * | 10/2004 | Workman | 701/213 |
| 7,068,163 B2 * | 6/2006 | Sari et al. | 340/539.13 |
| 7,068,760 B2 * | 6/2006 | Binning | 379/45 |
| 7,123,141 B2 * | 10/2006 | Contestabile | 340/539.13 |
| 2004/0203989 A1 * | 10/2004 | Karaoguz | 455/522 |

* cited by examiner

*Primary Examiner*—Toan N. Pham
(74) *Attorney, Agent, or Firm*—Larson & Larson; Frank Liebenow

(57) ABSTRACT

A text message containing a natural language request is sent from an originating station to a central server. The server parses the request and uses the originating station identification to authorize the request and determine the address of the object. The server then sends a request to the address of the object, the object acts upon the request and sends results and acknowledgements back to the server, where the results and acknowledgement are translated back into a natural language and sent to the originating station.

49 Claims, 10 Drawing Sheets

SYSTEM, METHOD AND APPARATUS FOR LOCATING AND CONTROLLING OBJECTS

BACKGROUND OF THE INVENTION

1. Field of the Invention

This invention relates to the field of remote electronic locating and control devices and more particularly to a device for reporting its location and environment and initiating actions remotely.

2. Description of the Prior Art

Tracking the location of an object; be it an animate object or an inanimate object such as a car, truck, a person or a priceless piece of art has been a concern for many years. Moving companies, package delivery companies and trucking fleet companies are concerned about the whereabouts of their vehicles. Car owners are concerned about their car when it is lost or stolen. Parents are concerned about the whereabouts of their children and elders. Museums are concerned about the location of their art works. Supermarkets are concerned about the location of their shopping carts. Law enforcement officials are concerned with the whereabouts of criminals who are repeat offenders or who are under house arrest. The examples are endless. Furthermore, often additional information or control is desired such as the speed of the object, the temperature of the object and/or operation of devices. Additionally, it may be desired to remotely initiate a secure transaction with the device, such as unlocking the device, enabling a feature, turning a light or alarm on or off, etc.

Determining the location of the object in the locale of the object is known. For instance, a Global Positioning System installed in a vehicle will tell someone within the vehicle where they are. Relaying that information back to a remote location has been done, but, in general, requires a service with operators, a special remote device or access to the internet. Nothing suggests using natural language commands entered as text messages into an off-the-shelf cell phone and retrieving natural language text message responses describing a location or other information on the same phone.

Various solutions and services have been invented and developed to address some of these problems. U.S. Pat. No. 6,441,778, titled "Pet Locator", refers to one solution using a GPS receiver to determine if the object's location is within a coordinate range and sends location information to a base station upon detecting the location is outside of the coordinate range. Much of the prior art depends on proprietary transmission methods and/or proprietary user terminal devices. U.S. Pat. No. 6,172,640 to Durst, et al. refers to a solution using two-way paging to communicate between a base station and an object locator. This system does not provide any natural language support and no or limited security (e.g., anyone can send a page request to a locator device).

What is needed is a locator that will respond to natural language commands entered on a readily available user terminal, providing security and optional measurement and control.

SUMMARY OF THE INVENTION

In one embodiment, a locator system is disclosed including an originating device having an originating device address and a device for entering a natural language request message and a transceiver adapted to send the natural language request message to a server and configured to receive a natural language response message from the server and a display for displaying the natural language response message. The server of the system includes a device for receiving the natural language request message from the originating device and receiving the originating device address of the originating device, a device to translate the originating device address and the natural language request message into a locator device address and an encoded request, a device for sending the encoded request to a locator device at the locator device address, a device for receiving an encoded response from the locator device and for receiving the locator device address, a device for translating the encoded response into the natural language response message and a device to send the natural language response message to the originating device at the originating device address. The locator device includes a location receiver for measuring an approximate location of the locator device, a second transceiver adapted to receive the encoded request from the server and adapted to transmit the encoded response to the server and a controller connected to the location receiver and the second transceiver, the controller configured to receive the encoded request from the second transceiver, read location information from the location receiver, generate the encoded response and send the encoded response to the transceiver.

In another embodiment, a method of locating is disclosed including sending a natural language request message from an originating device to a server, the originating device having an originating device address, translating the originating device address and natural language request message into a locator device address and an encoded request, sending the encoded request from the server to a locator device at the locator device address, acting upon the encoded request at the locator device, sending an encoded response back from the locator device to the server, translating the encoded response into a natural language response message and sending the natural language response message to the originating device at the originating device address.

In another embodiment, an apparatus for managing a locator system is disclosed including a server, a device for receiving a natural language request message and an originating device address assigned to an originating device, a device for translating the originating device address and the natural language request message into a locator device address and an encoded request, a device for sending the encoded request to a locator device at the locator device address, a device for receiving an encoded response from the locator device, a device for translating the encoded response into a natural language response message and a device for sending the natural language response message to the originating device.

In another embodiment, a locator system is disclosed including an originating device having an originating device address and a device for entering a natural language request message and a transceiver adapted to send the natural language request message to a server and configured to receive a natural language response message from the server and a display for displaying the natural language response message. The server of the system includes a device for receiving the natural language request message from the originating device and receiving the originating device address of the originating device, a device to translate the originating device address and the natural language request message into a locator device address and an encoded request, a device for sending the encoded request to a locator device at the locator device address, a device for receiving an encoded response from the locator device and for receiving the locator device address, a device for translating the encoded response into the natural language response message and a device to send the natural language response message to the originating device at the originating device address. The locator device includes a second transceiver adapted to receive the encoded request from the server, adapted to measure an approximate location of the locator device and adapted to transmit the encoded response to the server; and a controller connected to the second transceiver, the controller configured to receive the encoded request from the second transceiver, read location information from the second transceiver, generate the encoded response and send the encoded response to the transceiver.

In another embodiment, a method of locating is disclosed including sending a natural language request message from an originating device to a server, the originating device having an originating device address, translating the originating device address and natural language request message into a locator device address and an encoded request, sending the encoded request from the server to a locator device at the locator device address, acting upon the encoded request at the locator device, sending an encoded response back from the locator device to the server, translating the encoded response into a natural language response message and sending the natural language response message to the originating device at the originating device address, the locator device using an integral message transceiver to determine its location.

In another embodiment, a method of locating is disclosed including sending a natural language request message from an originating device to a server, the originating device having an originating device address and translating the originating device address and natural language request message into a locator device address and an encoded request. Next, an encoded request is sent from the server to a wireless network and the wireless network determines an approximate location of the locator device. The wireless network sends an encoded response back to the server containing the approximate location where the encoded response is translated into a natural language response message which is then send to the originating device at the originating device address, the locator device comprises at least a radio frequency transmitter.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
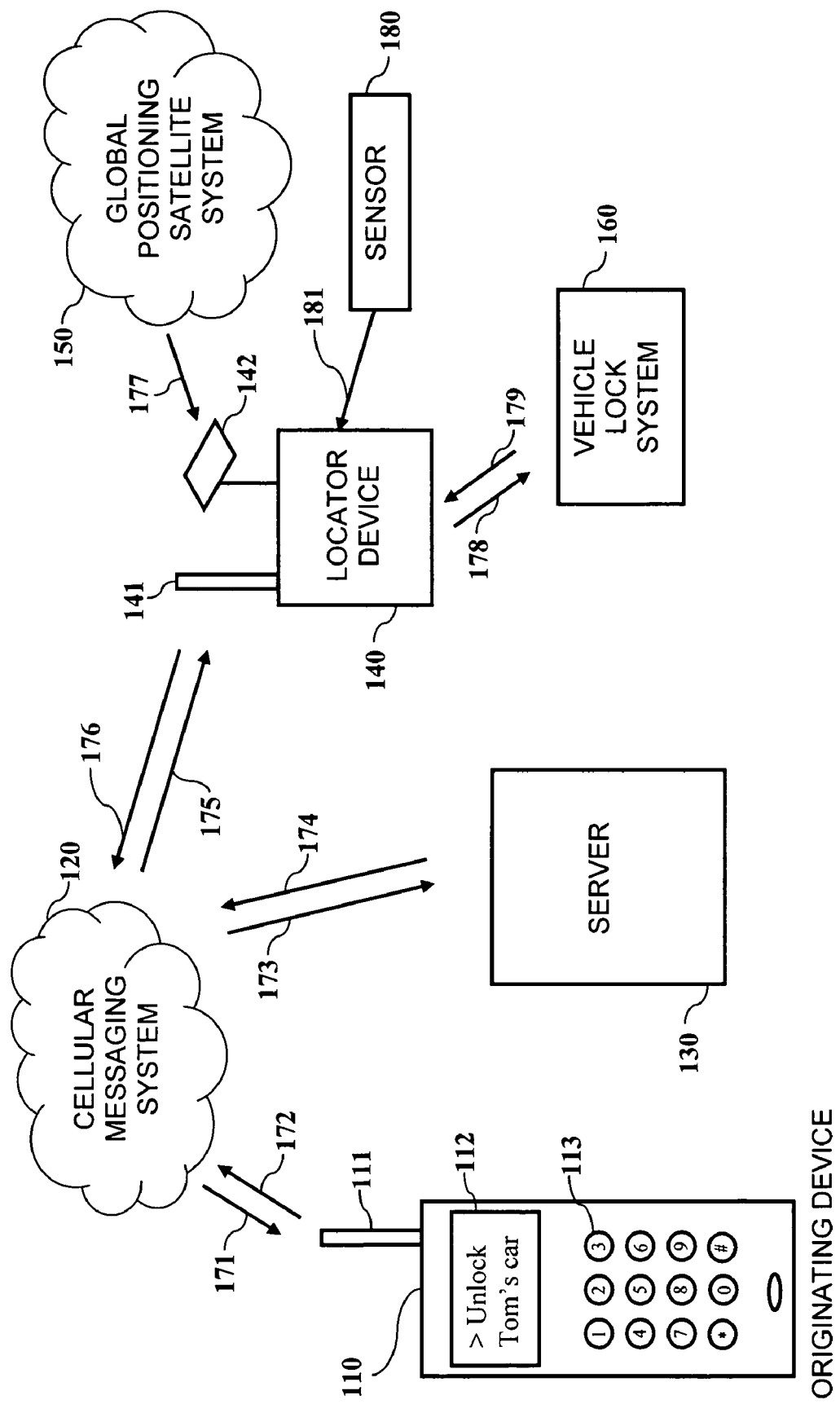
FIG. 1 illustrates a schematic view of a system of a first embodiment of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view of a system of the present invention is shown. In this, an originating device 110 is shown having an antenna 111. In One embodiment, the originating device is a cell phone or satellite phone capable of sending and receiving text messages. Integrated into the cellular phone is a transceiver capable of sending and receiving these text messages. There are many methods of sending and receiving text messages, some using the data side of a cellular wireless network and some using the voice channel of a cellular wireless network and some using non-cellular networks. The present invention is not limited to any particular wireless transport method, though in one embodiment, the text messages conform to the Short Message System (SMS). The Short Message System is part of the Global System for Mobile communications (GSM) Phase 1 standard and is a short message exchanged between two mobile devices or between a nonmobile device and a mobile device (for example, a short message can be sent to a server attached to the Internet to a mobile subscriber). Short messages are stored in and forwarded from a Short Message Service Center (SMSC) so the recipient can get messages that arrive when their mobile device is not turned on. SMS is included in various 2G, 2.5G and 3G cellular telephony standards, such as the two main 3G technologies: UMTS with wideband CDMA (W-CDMA) in Europe, and cdma2000 with multi-carrier CDMA (MC-CDMA) in the USA. Many 3G systems operate in the 2 GHz frequency band, and are designed to provide a range of data rates from 144 kbps to 2 Mbps, depending on the user's location and circumstances. The present invention is not limited to any particular short message service.

The messages are created using a keypad or keyboard 112 of the originating device 110. It is known in the cellular and satellite phone art how to create text message using the 12 button numeric keypad 113 (each button representing up to four letters) or using a hand-held keyboard having many of the alpha-numeric keys from a standard keyboard, for example the well-known Blackberry device. Many other methods of entering text messages on an originating device are known and may be applied without limiting the scope of the present invention. It is also anticipated that a natural language request message can be composed at the satellite or cellular phone using voice recognition. In general, a natural language request consists of a verb (e.g., "locate"), an object (e.g., "Tom's Car") and an optional modifier (e.g., "on" or "off"). Also, the object of the request is referred to as an alias. In this way, many different natural language requests are supported in a way that is easy to use and remember; for example: "where is Tom" or "read Tom's temperature".

The originating device 110 can send 172 and receive 171 short messages through a messaging system 120, such as the cellular messaging system to a nonmobile device, in this case a server 130. Short messages received by the originating device 110 are displayed on a display 112, either when they are received or under the control of a user.

The server 130 can send 174 and receive 173 short messages to either the originating device 110 or to the locator device 140, also having an antenna 141. The server 130 communicates with the cellular messaging system 120 through the cellular system, in which case it has a cellular transceiver, or through a telephone link to the cellular messaging system or, in some embodiments, through the internet directly to/from the SMSC, or some other wired path. The locator device 140 also can send 176 and receive 175 short messages to and from the server 130 through messaging system 120. An important aspect of this system is the addressing of the messages and the security of the addresses. In SMS systems, generally, the addresses are the phone number associated with the device, conforming to the North American Numbering Plan for the Public Switched Telephone System in the United States or other numbering plans for other countries. This numbering plan conforms to the International Telecommunications Union recommendation E.164, providing a ten digit number of the form NXX-NXX-XXXX, where X is any digit 0–9 and N is any digit 2–9. For example, the originating device 110 has an associated phone number of 727-555-0660 also called the Originating Device Address (ODA), the server 130 has an associated phone number of 727-555-9999 and the locator device 140 has an associated phone number of 727-555-0010, called the locator device address (LDA). The messaging system 120 not only uses these addresses to route the short messages to the proper destination, but reports the originating address to the destination. Therefore, the security of the system is enhanced by the messaging system, in that, when the server 130 receives a short message from the originating device 110, it also receives the originating devices address or phone number (e.g., 727-555-0660), thereby assuring that the request is coming from an originating device authorized to make requests of a specific locator 140 or set of locators 140 associated with an originating device. The same is true of the locator, in that it can be established that only one server 130 or a set of servers 130 are authorized to communicate with any given locator 140 and, in order to add a new server 130, a previously valid server 130 must send an authorization command to the locator 140 including the address (e.g., phone number) of the new server.

In some embodiments, the locator device has a way of detecting its own location using a location receiver to measure an approximate location. One example of a location receiver is a Global Positioning System (GPS) 150 receiver that receives a radio frequency signal 177 from several GPS satellites at its antenna 142. Another example of a location receiver uses a Time Difference of Arrival (TDOA) receiver described in U.S. Pat. No. 5,327,144, Jul. 5, 1994, "Cellular Telephone Location System," with enhancements disclosed in U.S. Pat. No. 5,608,410, Mar. 4, 1997, "System for Locating a Source of Bursty Transmissions," both of which are hereby incorporated by reference. Another example of a location receiver uses the Cell-ID to approximate the location, for example an identification of the cell tower that is closest to the receiver. Another example of a location receiver is a system capable of triangulating a location, or a system of location comprising a combination of several different location methods (i.e., Network Assisted GPS). In other embodiments, the wireless network determines the location of the locator device by detecting a radio frequency signal being transmitted by a transceiver within the locator device and triangulating that signal with a plurality of wireless network transceivers. For example, a cellular phone network determines the location of a transceiver (a cell phone) for E911 location determination by receiving a signal at a plurality of cell towers and triangulating the location using signal strength variations or timing differences. In this embodiment, there is no location receiver in the locating device, there is a radio frequency transceiver to emit the radio frequency signal and send/receive other commands. Instead, the server sends an encoded command to the wireless network and the wireless network responds with the location of the locator device.

In some embodiments, the locator device is secured in place, impeding removal from persons or vehicles, for example. Optionally, the locator device 140 has the ability to read sensor information 181 from a sensor 180, such as a temperature sensor, a speed sensor, a humidity sensor, a door-open sensor, or the like. Optionally, the locator device is configured to control an external device 160 through an output port 178 and receive an acknowledgement that the control took effect 179, in this example, controlling a vehicle locking system 160.

Figure 2:
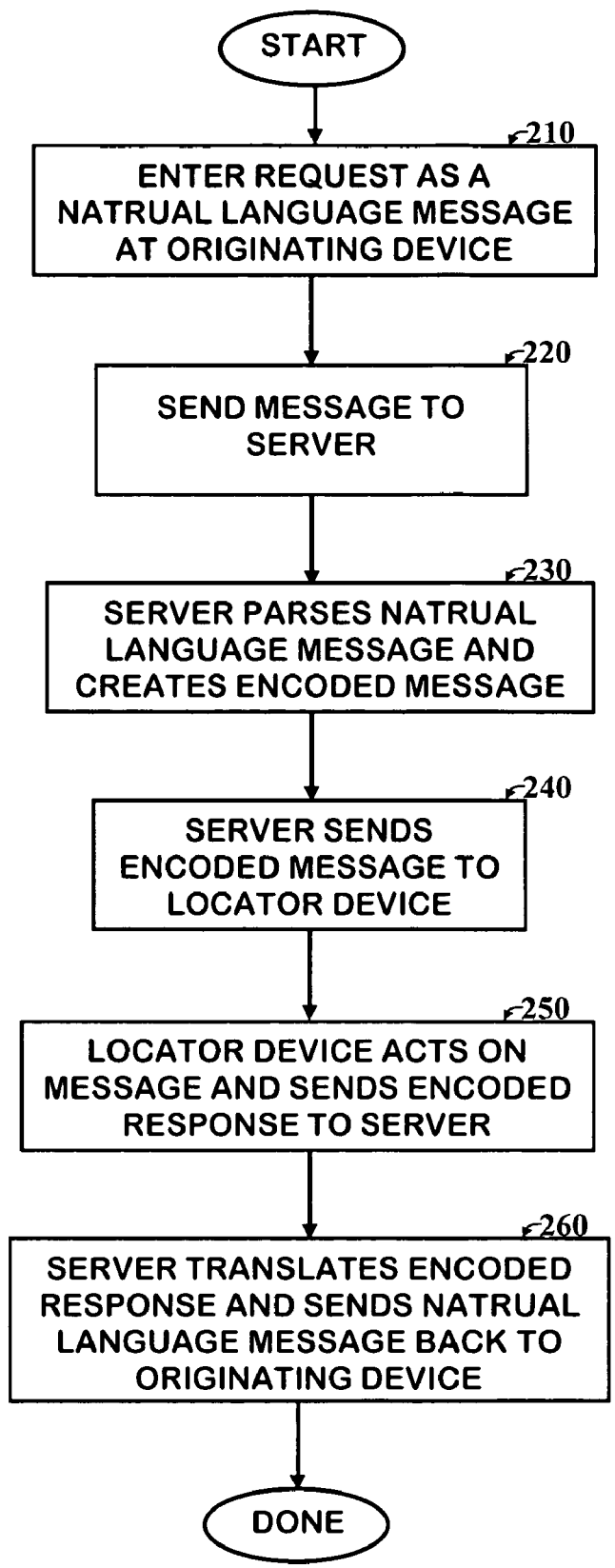
FIG. 2 illustrates a first flow chart of the first embodiment of the present invention.
Figure 7:
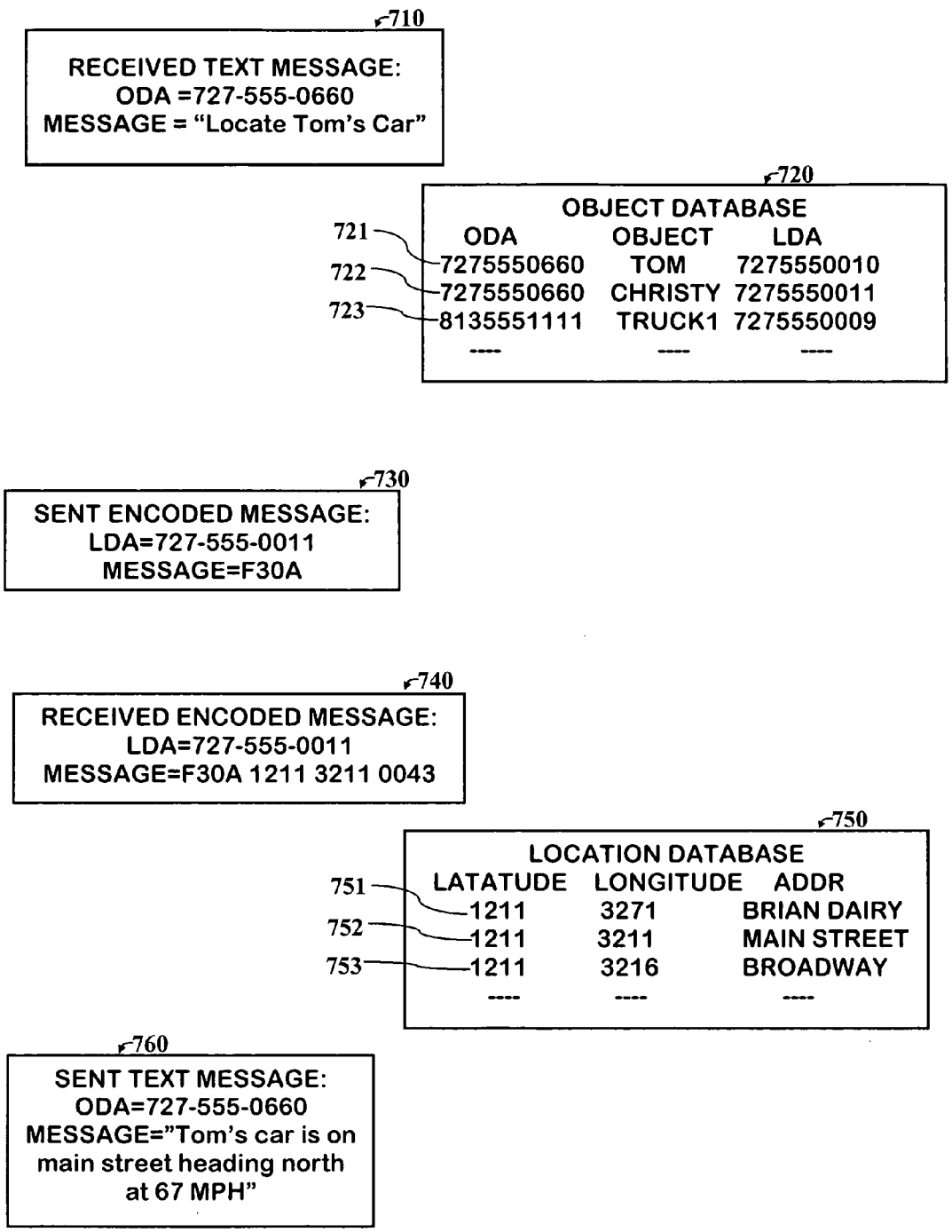
FIG. 7 illustrates sample message formats and address translation tables of an embodiment of the present invention.

Referring now to FIG. 2 in conjunction with FIG. 7, the operation of the locating system will be described using the system shown in FIG. 1. To start, a request is entered as a natural language message 210. The request is in the form of a natural language command so that a person at the originating device can enter the message in a language with which they are familiar, such as English, French, German or Spanish, or even Chinese or Japanese. For example, if the person wants to locate Tom's car, they might enter a natural language command such as, "Locate Tom's Car." They may also enter abbreviations such as, "L Tom's C" or "L Tom C." Additionally, they may enter synonyms for commands or objects such as "whereis Tom's car" or "find Tom's car." The entire natural language request is sent to the message server, or server 220, as a short message where it is parsed 230 to determine its validity, content and context. Within the server, a software program parses the request, determining what is being asked (e.g., "where is") and what is the object of the request (e.g., "Tom's car"). Additionally, the address of the originating device (ODA) 110 is used to determine context (e.g., there may be many "Tom's car") and authorization so that the correct locator device is determined and to prevent unauthorized originating devices from requesting the location of Tom's car. If the authorization fails or the natural language command is invalid, the request is denied and a natural language error message is sent back to the originating device 110, for example, "Unknown command". The software program uses databases or tables such as the Object Database 720 having an Object Device Address (ODA), a natural language name (Name) and an locator device address (LDA) to determine the validity and context of the received message 710. In this example, the receive message 710 is "Locate Tom's Car", and the Originating Device Address (ODA) is 727-555-0660. The software program searches the Object Database 720 and finds the ODA of 727-555-0660 and name "Tom" as the first entry 721. Thereby, the software program knows it has a valid ODA and a valid object (e.g., "Tom's car") and can proceed. In this exemplary table 720, the ODA of 727-555-0660 can request the location of "Tom" 721 and "Christy," 722 but since it does not match the ODA of "Truck1" 723, it cannot request to location of "Truck1" 723. Finding a valid object, the software program encodes an encoded message 240 containing a command such as "Locate" in a binary format 730 and sends the encoded command to the locator device 240 at the locator device address (LDA) read from the database or table 720, in this example 727-555-0010. The locator device at that address acts upon the command 250, determining its current location using the Global Positioning System 150 and creating an encoded response to send back to the server, including the latitude, longitude, altitude, trajectory and speed in a binary format 740, for example. The server translates the binary command into a natural language response message and sends it back to the originating device 260, using a table or database or mapping system 750 to translate the latitude and longitude into a street address. In this example, the encoded message includes a latitude of 1211 and a longitude of 3211 that, when looked up in the Location Database or table 750, matches the second line 752 which indicates the locator device is on Main Street and not on Brian Dairy 751 and not on Broadway 753, etc.

The translated natural language response message 760 is then sent back to the originating device 110 in a natural language that can be understood by the person operating the originating device, such as, "Tom's car is on main street heading north at 67 MPH." In order to send the response back to the proper originating device the ODA of 727-555-0660 is remembered. In some embodiments, it is added as a field within the encoded messages while in another embodiment it is stored in a transaction file (not shown) while in other embodiments it is derived from the Object Database 720 by a reverse lookup of the locator device address (LDA). In this example, the locator device address being 727-555-0010 is looked up in the Object Database 720 to determine the first line 721 matches this locator device address, therefore, the object named is Tom and the address of the ODA is 727-555-0660, hence the response message is sent to 727-555-0660. Of course, this embodiment will only work if there is, at most, one ODA that can make requests on any given locator device. Otherwise it would be impossible to tell which ODA made the request unless it was encoded into the encoded messages or stored in a transaction tracking file. In some embodiments, the ODA is encoded in the encoded request and echoed back in the encoded response.

Figure 3:
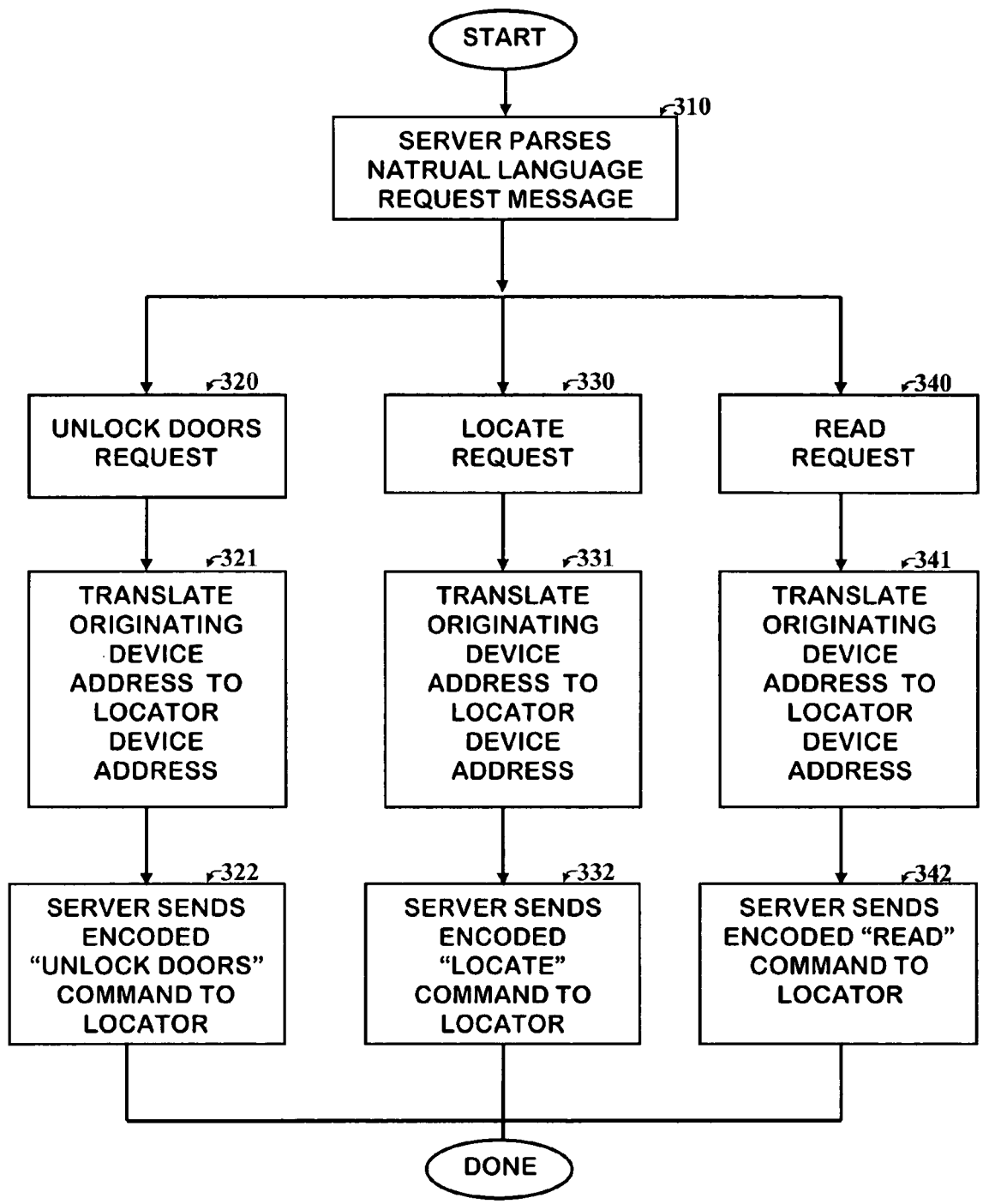
FIG. 3 illustrates a second flow chart of the first embodiment of the present invention.
Figure 4:
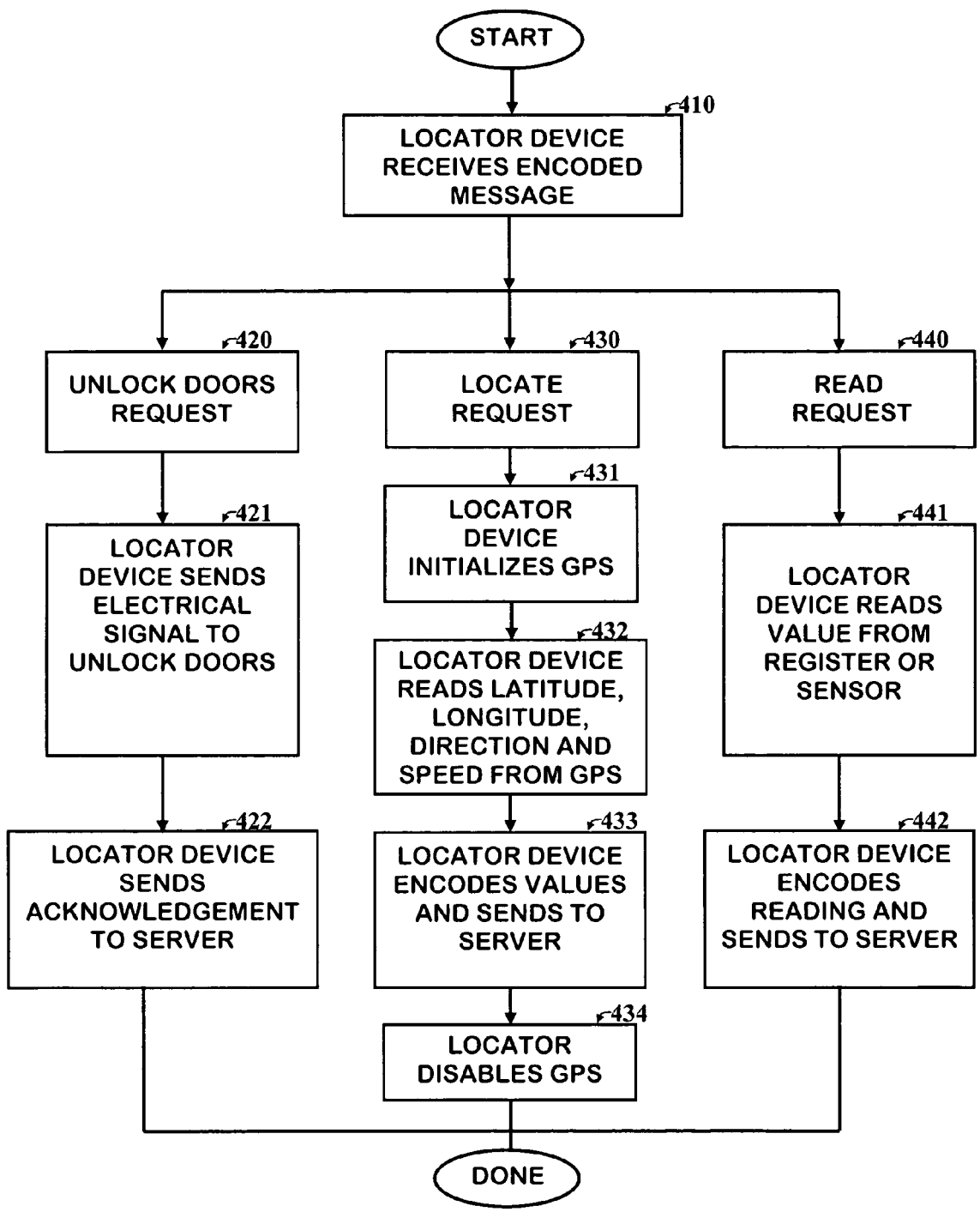
FIG. 4 illustrates a third flow chart of the first embodiment of the present invention.
Figure 5:
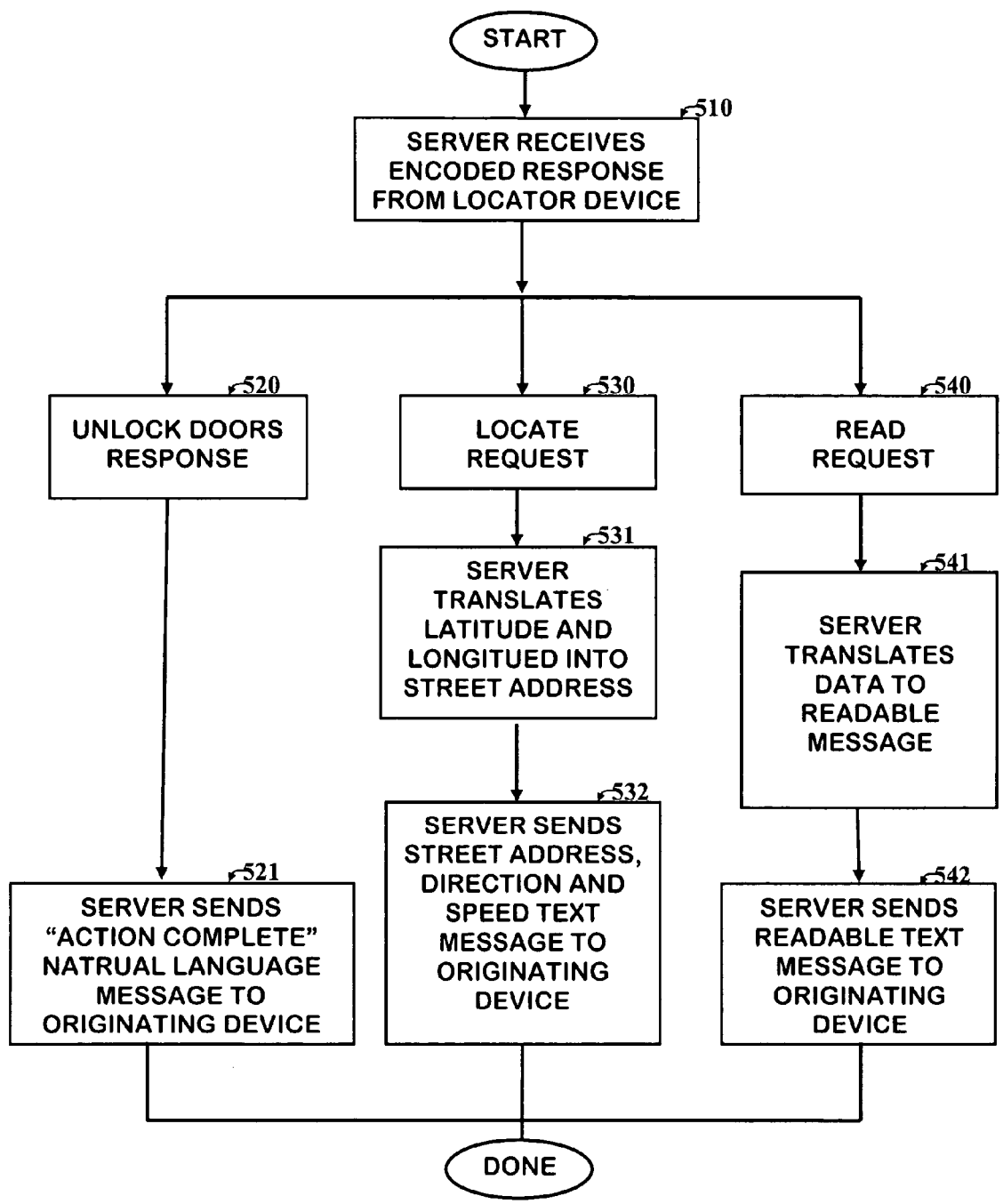
FIG. 5 illustrates a fourth flow chart of the first embodiment of the present invention.

Referring now to FIG. 3, FIG. 4 and FIG. 5 in conjunction with FIG. 7, the operation of the server system will be described using the system shown in FIG. 1. After the server receives a request message, it parses the natural language request 310 to determine the nature of the command and the object of the command. In this example, three commands are supported: unlock doors 320, locate 330 and read 340, although any number of commands are possible including "enable," "disable," "lock down," "set maximum speed," "motion on," "motion off" and "howsitgoing." If the command is "unlock doors" 320, then the originating device address (ODA) and object ("e.g., Tom's car") is translated onto a locator device address (LDA) 321, in this example using a table 720 and, if valid, the server generates and sends an encoded command to the locator device address 322. In this example, the command is encoded as a few bits of information that would be simple for the locator device to understand such as 03 for unlock. If the command is "locate" 330, then the originating device address (ODA) and object (e.g., "Tom's car") is translated onto a locator device address 331, using a table 720 and, if valid, the server generates and sends an encoded command to the locator device address 332. The command is encoded as a few bits of information that would be simple for the locator device to understand such as 04 for locate. If the command is "read" 340, then the originating device address (ODA) and object (e.g., "Tom's car") is translated into a locator device address (LDA) 341, using a table 720 and, if valid, the server generates and sends an encoded command to the LDA 342. The command is encoded as a few bits of information that would be simple for the locator device to understand such as 05 for read followed by 01 for temperature or 02 for humidity.

Continuing with FIG. 4, the locator device at the locator device address receives the encoded message 410 and determines which command it has received: an unlock door command 420, a locate request 430 or a read request 440. If it is an unlock door request 420, the locator sends an electrical signal to unlock the doors 421, in some embodiments to an automotive lock system or a home lock system. The locator device then sends an acknowledgement back to the server 422 to close the event and notify the originating device of completion. If it is a locate request 430, the locator device initializes or turns on the GPS system 431 to determine its location and reads the location from the GPS system 432, then encodes the location and sends the information back to the server 433. To conserve power in battery operated situations, it is best that the GPS system be shut off until a location request is received, turned on, then turned back off. In this way, an idle locator will require very little power, mostly for powering the controller 620 and the transceiver 610, which is in a very low-power receive mode. In some embodiments, the locator device then turns OFF the GPS 434. If it is a read request 430, the locator device reads a value from a sensor 180, for example, the temperature. The locator device then sends an encoded message back to the server 442 including the reading.

Continuing with FIG. 5, the server receives the encoded response message 510 and determines which response it has received: an unlock door response 520, a locate response 530 or a read response 540. If it is an unlock door response 520, the server creates a natural language response message and sends it back to the originating device 521, for example, "Doors are open." If it is a locate response 530, the server translates the encoded location values within the encoded message into a natural language address 531, using a location table or database 750. For example, "Tom's car is at 550 Main Street" is the natural language response message sent to the originating device 532. If it is a response to a read request 540, the server converts the encoded read result into a natural language response message 541 and sends it back to the originating device 542—as an example, a binary temperature encoded as 2CH is decoded into 44 degrees Fahrenheit. The server then sends an encoded message back to the originating device 542 including the translated reading, for example, "Temperature is 44 degrees Fahrenheit." In each case, the server software uses the Object Database 720 to perform a reverse lookup of the locator device address (LDA) to determine the originating device address (ODA) or, the encoded messages contain a field that carries the originating device address (ODA) and that address is used instead of looking up an address or tracking the originating device address in a transaction file.

Figure 6:
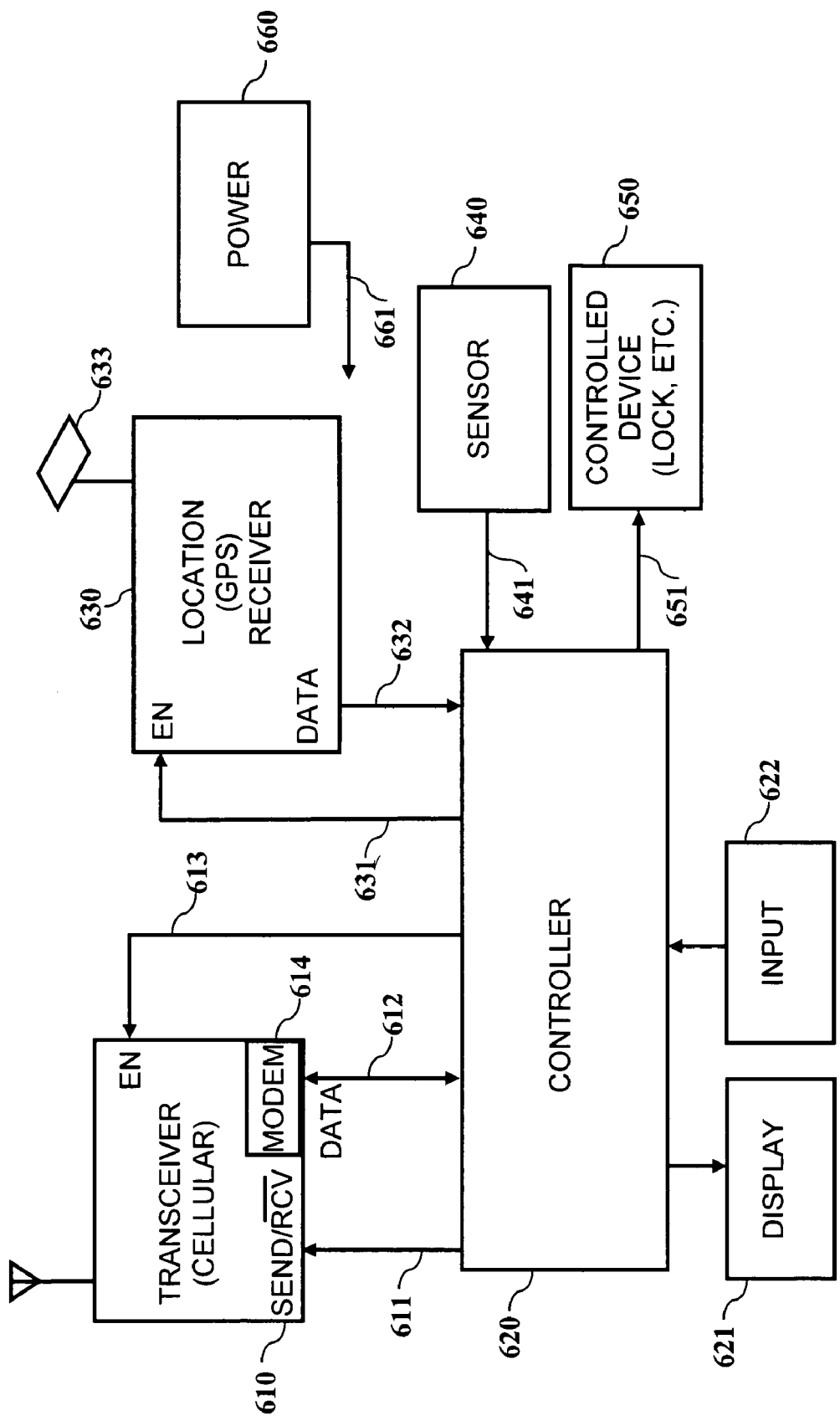
FIG. 6 illustrates a schematic view of a locator device of the first embodiment of the present invention.

Referring now to FIG. 6, a block diagram of a locator device is shown. Central is a controller 620 that is a processing element, in some embodiments a microcontroller or other CPU such as an Intel® 8051 or the like. In another embodiment, the controller 620 is part of a larger computing system such as an automotive processor that performs other duties beyond responding to the commands described here within. The controller is adapted to control the send/receive operation 611 of the transceiver 610 such as a cellular transceiver 610 and send/receive data 612 to/from the transceiver 610. The transceiver 610 is adapted to communicate bi-directionally with the server 130 through a wireless messaging system. There are many methods of sending and receiving data within a wireless messaging system, some using the data side of a cellular wireless network and some using the voice channel of a cellular wireless network and some using non-cellular networks. The present invention is not limited to any particular wireless transport method, though in one embodiment, the text messages conform to the Short Message System (SMS). The controller enables or disables 613 the receiver 610 to conserve power, especially in battery operated configurations. The transceiver includes a modulator/demodulator (MODEM) 614 for coding/decoding the short messages over the radio frequency spectrum. In the present invention, the MODEM 614 is considered part of the transceiver being that several companies offer an integrated radio transceiver with Modem in one package.

Also connected to the controller is a location determination system or location receiver 630, in this example, a Global Positioning System (GPS) with an antenna 633 to receive positioning coordinates from the GPS satellites. Position data can be read 632 by the controller and the GPS receiver can be enabled or disabled 631 to conserve power, especially in battery operated configurations. Another example of a location receiver uses a Time Difference of Arrival (TDOA) receiver. Another example of a location receiver uses the Cell-ID to approximate the location, for example an identification of the cell tower that is closest to the receiver. Another example of a location receiver is a system capable of triangulating a location, or a system of location comprising a combination of several different location methods (i.e., Network Assisted GPS). In some embodiments, the location receiver is embedded within the transceiver 610, utilizing the same transceiver as the wireless messaging system. In these embodiments, there is no separate location receiver 630, but a portion of the transceiver 610 performs the locating function.

In some embodiments, various sensors are monitored 640 by an input port 641 on the controller 620, such as temperature sensors, humidity sensors, door position sensors, speed sensors, passenger sensors and intrusion sensors. In some embodiments, various devices 650 are controlled by an output port 651 of the controller 620, such as vehicle locks, home locks, a horn, a siren, lights or a display.

For completeness, a power source 660 is shown connecting to each device 661 within the locator. In some embodiments, the power source 660 is a secondary source such as an alkaline battery, a rechargeable source such as a Lithium Ion battery or power from the system being monitored, e.g., a car battery.

In some embodiments, a display 621 is connected to the controller for the display of short messages or indicators. For example, in a vehicle system, the display 621 is configured to display warning messages from the originating device, for example, "You are going to fast."

In some embodiments, an input device 622 is connected to the controller 620 to provide user information or to initiate an action. For example, the input device 622 is a switch that has two positions—home or away, whereas the encoded message conveys the position of the switch to the originating device 110 when an encoded response is sent. In another example, the input device 622 is a panic switch, where operation of the switch causes the locator device to send an unsolicited, encoded message to the server 130, optionally with location information from the location detector 630, to the server for later notification of law enforcement agencies. In another example, the input device 622 is a tamper detector that signals the controller 620 of an attempt to remove the locator device 140 from, for example, a person. In this example, the controller 620 sends an encoded response to the server 130 without having received an encoded request and, in response, the server broadcasts natural language response messages to one or more originating devices 110, even though they did not make a request. In some cases, the message is a warning such as, "Warning: Tom has removed his tracking bracelet."

Figure 8:
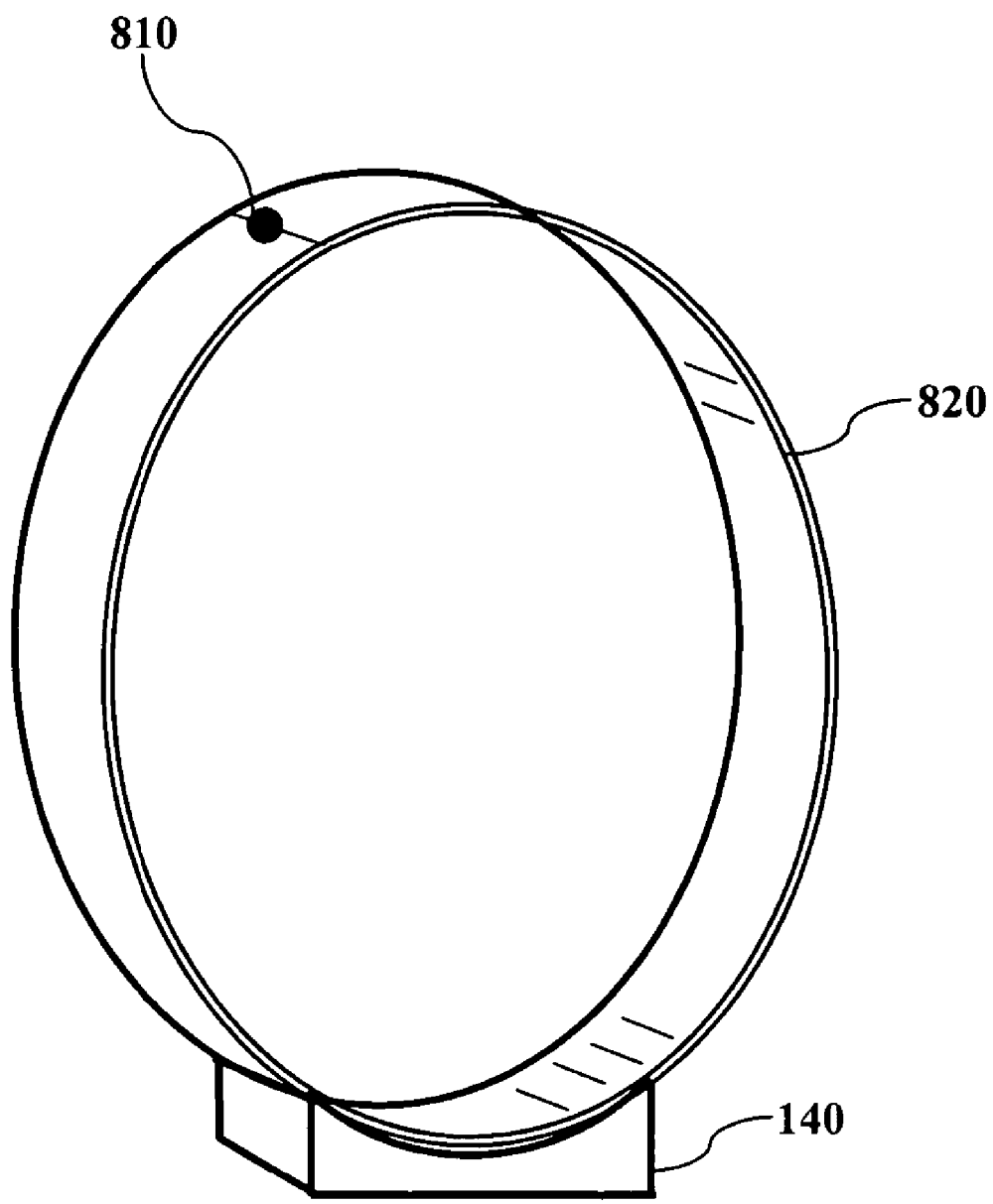
FIG. 8 illustrates a belt or bracelet or shackle with an attached locator of any of the embodiments of the present invention.

Referring now to FIG. 8, an embodiment of the present invention having the locator attached to a belt, bracelet or shackle is shown. In this, the locator 140 is securely mounted to a belt, bracelet or collar 820 to impede removal. The belt, bracelet or collar 820 has a security latch 810 that requires a tool or key to open, thereby securing the belt, bracelet or collar to an object, for example a person's waist, arm, leg or neck. In some embodiments, a sensor 640 is located at the security latch and connected to an input of the controller 620 so as to provide a remote indication of the removal of the belt, bracelet or collar 820.

Figure 9:
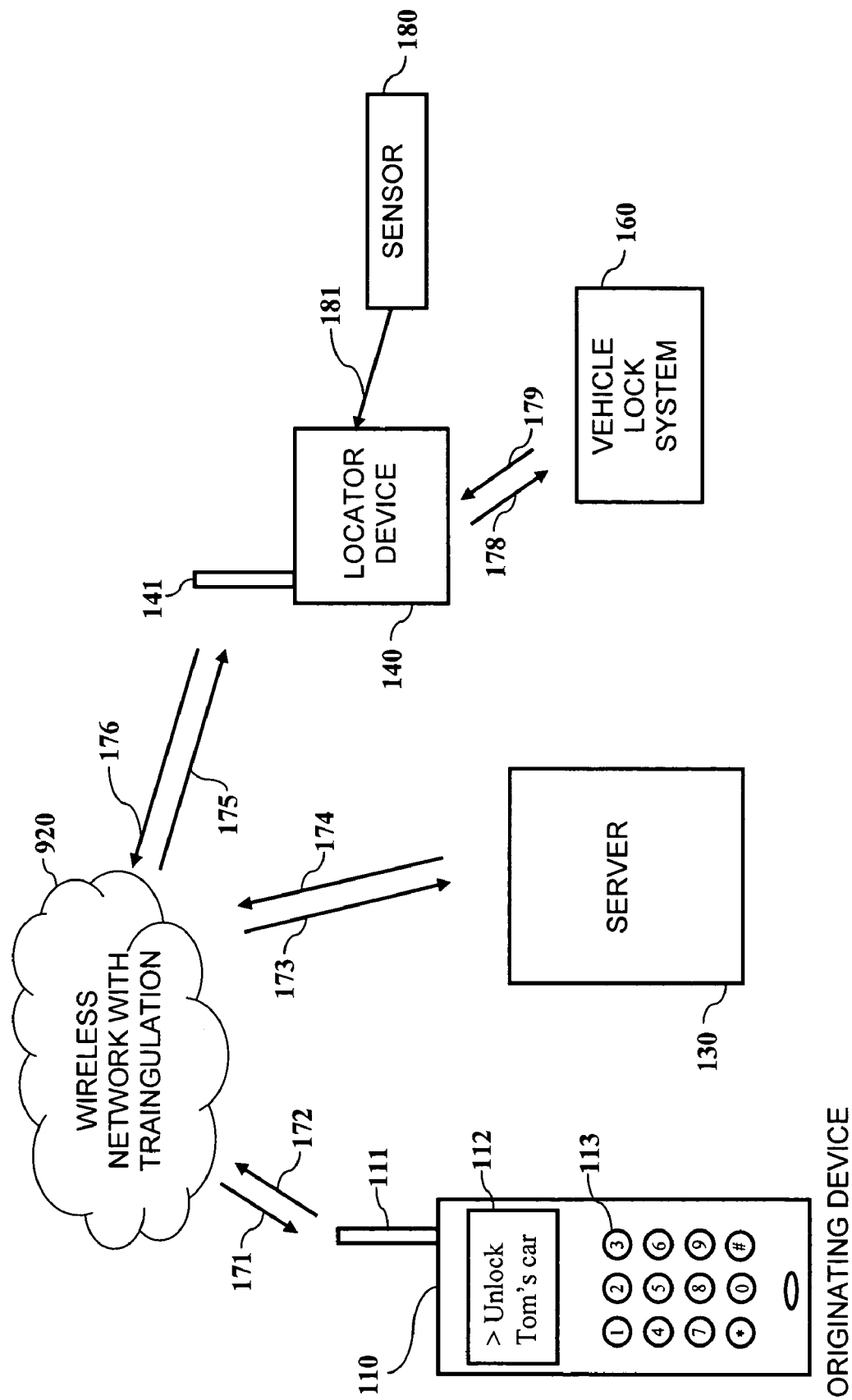
FIG. 9 illustrates a schematic view of a system of second embodiment of the present invention.

Referring to FIG. 9, a schematic view of a system of a second embodiment of the present invention is shown. In this, an originating device 110 is shown having an antenna 111. In One embodiment, the originating device is a cell phone or satellite phone capable of sending and receiving text messages. Integrated into the cellular phone is a transceiver capable of sending and receiving these text messages. There are many methods of sending and receiving text messages, some using the data side of a cellular wireless network and some using the voice channel of a cellular wireless network and some using non-cellular networks. The present invention is not limited to any particular wireless transport method, though in one embodiment, the text messages conform to the Short Message System (SMS). The present invention is not limited to any particular short message service.

The messages are created using a keypad or keyboard 112 of the originating device 110. It is known in the cellular and satellite phone art how to create text message using the 12 button numeric keypad 113 (each button representing up to four letters) or using a hand-held keyboard having many of the alpha-numeric keys from a standard keyboard, for example the well-known Blackberry device. Many other methods of entering text messages on an originating device are known and may be applied without limiting the scope of the present invention. It is also anticipated that a natural language request message can be composed at the satellite or cellular phone using voice recognition. In general, a natural language request consists of a verb (e.g., "locate"), an object (e.g., "Tom's Car") and an optional modifier (e.g., "on" or "off"). Also, the object of the request is referred to as an alias. In this way, many different natural language requests are supported in a way that is easy to use and remember; for example: "where is Tom" or "read Tom's temperature".

The originating device 110 can send 172 and receive 171 short messages to and from a server 130 through a wireless network with triangulation 920, an example of which is the cellular phone system. Short messages received by the originating device 110 are displayed on a display 112, either when they are received or under the control of a user.

The server 130 can send 174 and receive 173 short messages to the originating device 110 and in some embodiments to the locator device 140, also having an antenna 141. The server 130 communicates with the wireless network with triangulation 920 through the cellular system, in which case it has a cellular transceiver, or through a telephone link to the cellular messaging system or, in some embodiments, through the internet directly or some other wired communications path. The locator device In this embodiment, the wireless network with triangulation 920 determines the location of the locator device by detecting a radio frequency signal being transmitted by a transceiver 610 within the locator device and triangulating that signal with a plurality of wireless network transceivers. For example, a cellular phone network determines the location of a transceiver (a cell phone) for E911 location determination by receiving a signal at a plurality of cell towers and triangulating the location using signal strength variations or timing differences. In this embodiment, there is no transceiver in the locating device, there is a radio frequency transceiver to emit the radio frequency signal and send/receive other commands. Instead, the server sends an encoded command to the wireless network and the wireless network responds with the location of the locator device. In other embodiments, there is a transceiver instead of a receiver for processing other commands such as reading sensor information, etc. In one embodiment, an encoded request is sent from the server to the transceiver to initiate the transceiver's transmitter so that the wireless network with triangulation 920 can triangulate its location and a second encoded request is sent from the server to the transceiver to stop the transceiver's transmitter to save power.

Figure 10:
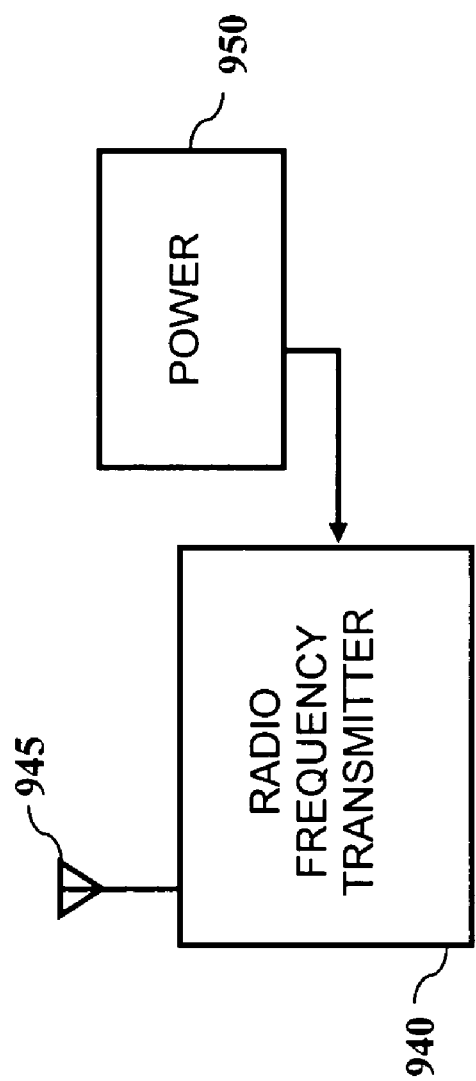
FIG. 10 illustrates a schematic view of a locator device of the second embodiment of the present invention.

Referring now to FIG. 10, a block diagram of a locator device of a second embodiment is shown. In this embodiment, a transmitter 940 is adapted to send a radio frequency signal through an antenna 945. In some embodiments, the signal is continuously transmitted. In other embodiments, the transmitter periodically wakes up, transmits the radio frequency signal, then goes back to sleep so that power 950 may be conserved. In some embodiments, the locator device is secured in place, impeding removal from persons or vehicles, for example. The transmitter 940 sends a radio frequency signal that can be detected by the wireless network with triangulation 920, where its location is determined.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A locator system comprising:
   an originating device having an originating device address, the originating device comprising:
   a means for entering a natural language request message;
   a transceiver adapted to send the natural language request message to a server and the transceiver configured to receive a natural language response message from the server; and
   a display for displaying the natural language response message;

the server comprising:
   a means for receiving the natural language request message from the originating device and receiving the originating device address of the originating device;
   a means to translate the originating device address and the natural language request message into a locator device address and an encoded request;
   a means for sending the encoded request to a locator device at the locator device address;
   a means for receiving an encoded response from the locator device and for receiving the locator device address;
   a means for translating the encoded response into the natural language response message; and
   a means to send the natural language response message to the originating device at the originating device address;

the locator device comprising:
   a location receiver for measuring an approximate location of the locator device;
   a second transceiver adapted to receive the encoded request from the server and adapted to transmit the encoded response to the server; and
   a controller connected to the location receiver and the second transceiver, the controller configured to receive the encoded request from the second transceiver, read location information from the location receiver, generate the encoded response and send the encoded response to server through the transceiver.

2. The locator system of claim 1, wherein the location receiver is selected from the group consisting of a Global Positioning Satellite (GPS) receiver, a Time Difference of Arrival (TDOA) receiver, a cellular-id approximation receiver, a triangulation system and a network assisted Global Positioning Receiver.

3. The locator system of claim 1, wherein the transceiver is a cellular telephone radio transceiver adapted to send and receive messages conforming to a short message standard (SMS).

4. The locator system of claim 3, wherein the second transceiver is a cellular telephone radio transceiver adapted to send and receive messages conforming to the short message standard (SMS).

5. The locator system of claim 1, further comprising a sensor connected to the controller, whereas the controller is adapted to read sensor data from the sensor and encode the sensor data into the encoded response.

6. The locator system of claim 5, wherein the sensor is selected from the group consisting of a thermal sensor, a pressure sensor, a speed sensor, a humidity sensor and a door position sensor.

7. The locator system of claim 1, further comprising a controlled device connected to the controller, whereas the controller is adapted to interpret the encoded request intended for the controlled device and initiate actions by the controlled device.

8. The locator system of claim 7, wherein the controlled device is selected from the group consisting of a lock system, a display, a light and an audible device.

9. The locator system of claim 1, wherein the locator device is affixed to a tamper resistant belt, bracelet or shackle.

10. A method for locating comprising:
    sending a natural language request message from an originating device to a server, the originating device having an originating device address;

translating the originating device address and natural language request message into a locator device address and an encoded request;
sending the encoded request from the server to a locator device at the locator device address;
acting upon the encoded request at the locator device;
sending an encoded response back from the locator device to the server;
translating at the server the encoded response into a natural language response message; and
sending the natural language response message to the originating device at the originating device address.

11. The method of claim 10, wherein the originating device is a standard cellular phone.

12. The method of claim 10, wherein the locating device comprises:
a transceiver adapted to send and receive short messages;
a location receiver for determining an approximate location of the locating device; and
a controller connected to the transceiver, the controller adapted to send and receive the short messages from and to the server through the transceiver, the controller also connected to the location receiver for reading the approximate location of the locating device.

13. The method of claim 12, wherein the location receiver is selected from the group consisting of a Global Positioning Satellite (GPS) receiver, a Time Difference of Arrival (TDOA) receiver, a cellular-id approximation receiver, a triangulation system and a network assisted Global Positioning Receiver.

14. The method of claim 12, wherein the acting upon the encoded request includes reading the approximate location of the locating device from the location receiver and encoding the approximate location of the locating device into the encoded response.

15. The method of claim 12, wherein the acting upon the encoded request includes turning on the location receiver, reading the approximate location of the locating device from the location receiver, turning off the location receiver and encoding the approximate location of the locating device into the encoded response.

16. The method of claim 12, wherein the controller is also connected to a sensor and whereas the acting upon the encoded request includes reading a value from the sensor and where the encoded response includes the value.

17. The method of claim 16, wherein the sensor is selected from the group consisting of a thermal sensor, a pressure sensor, a speed sensor, a humidity sensor and a door position sensor.

18. The method of claim 12, wherein the controller is also connected to a controlled device and whereas the acting upon the encoded request includes sending an electrical signal to the controlled device.

19. The method of claim 18, wherein the controlled device is selected from the group consisting of a lock system, a display, a light and an audible device.

20. The method of claim 12, wherein the locator device is affixed to a tamper resistant belt, bracelet or shackle.

21. An apparatus for managing a locator system, the apparatus comprising:
a server;
a means for receiving a natural language request message and an originating device address assigned to an originating device;
a means for translating the originating device address and the natural language request message into a locator device address and an encoded request;
a means for sending the encoded request to a locator device at the locator device address;
a means for receiving an encoded response from the locator device;
a means for translating the encoded response into a natural language response message; and
a means for sending the natural language response message to the originating device.

22. The apparatus for managing a locator system of claim 21, wherein the originating device address and the locator device address conform to the North American Numbering Plan.

23. The apparatus for managing a locator system of claim 22, wherein the means for receiving the natural language request message and the means for sending the encoded request and the means for receiving an encoded response and the means for sending the natural language response message includes sending and receiving short messages conforming to a Short Message System (SMS).

24. The apparatus for managing a locator system of claim 23, wherein the natural language request message includes a request for location information, the encoded request includes an encoded request for location information, the encoded response includes an encoding of an approximate location of the locator device and the natural language response message includes a natural language translation of the encoding of the approximate location of the locator device.

25. The apparatus for managing a locator system of claim 23, wherein the natural language request message includes a verb selected from the group consisting of "locate," "whereis," "find," "lockdown," "lock," "unlock," "maxspeed," "motion," "set," "reset," "howsitgoing," "read," and "get."

26. A locator system comprising:
an originating device having an originating device address, the originating device comprising:
a means for entering a natural language request message;
a transceiver adapted to send the natural language request message to a server and the transceiver configured to receive a natural language response message from the server; and
a display for displaying the natural language response message;
the server comprising:
a means for receiving the natural language request message from the originating device and receiving the originating device address of the originating device;
a means to translate the originating device address and the natural language request message into a locator device address and an encoded request;
a means for sending the encoded request to a locator device at the locator device address;
a means for receiving an encoded response from the locator device and for receiving the locator device address;
a means for translating the encoded response into the natural language response message; and
a means to send the natural language response message to the originating device at the originating device address;
the locator device comprising:
a second transceiver adapted to receive the encoded request from the server and adapted to transmit the encoded-response to the server, the second transceiver adapted to measure an approximate location; and a controller connected to the location receiver and the second transceiver, the controller configured to receive the encoded request from the second transceiver, turn on the location receiver, read location information from the location receiver, turn off the location receiver, generate the encoded response and send the encoded response to the transceiver.

27. The locator system of claim 26, wherein the second transceiver uses a triangulation system to determine the approximate location.

28. The locator system of claim 26, wherein the transceiver is a cellular telephone radio transceiver adapted to send and receive messages conforming to a short message standard (SMS).

29. The locator system of claim 28, wherein the second transceiver is a cellular telephone radio transceiver adapted to send and receive messages conforming to the short message standard (SMS).

30. The locator system of claim 26, further comprising a sensor connected to the controller, whereas the controller is adapted to read sensor data from the sensor and encode the sensor data into the encoded response.

31. The locator system of claim 30, wherein the sensor is selected from the group consisting of a thermal sensor, a pressure sensor, a speed sensor, a humidity sensor and a door position sensor.

32. The locator system of claim 26, further comprising a controlled device connected to the controller, whereas the controller is adapted to interpret the encoded request intended for the controlled device and initiate actions by the controlled device.

33. The locator system of claim 32, wherein the controlled device is selected from the group consisting of a lock system, a display, a light and an audible device.

34. The locator system of claim 26, wherein the locator device is affixed to a tamper resistant belt, bracelet or shackle.

35. A method for locating comprising:
sending a natural language request message from an originating device to a server, the originating device having an originating device address;
translating in the server the originating device address and natural language request message into a locator device address and an encoded request;
sending the encoded request from the server to a locator device at the locator device address;
acting upon the encoded request at the locator device;
sending an encoded response back from the locator device to the server;
translating in the server the encoded response into a natural language response message; and
sending the natural language response message from the server to the originating device at the originating device address, wherein the locator device comprises:
a transceiver adapted to send and receive short messages and the transceiver adapted to determine an approximate location of the locating device; and
a controller connected to the transceiver, the controller adapted to send and receive the short messages from and to the server through the transceiver, the controller adapted to read the approximate location of the locating device from the transceiver.

36. The method of claim 35, wherein the transceiver uses a triangulation system to determine the approximate location.

37. The method of claim 35, wherein the acting upon the encoded request includes reading the approximate location of the locating device from the transceiver and encoding the approximate location of the locating device into the encoded response.

38. The method of claim 35, wherein the controller is also connected to a sensor and whereas the acting upon the encoded request includes reading a value from the sensor and where the encoded response includes the value.

39. The method of claim 38, wherein the sensor is selected from the group consisting of a thermal sensor, a pressure sensor, a speed sensor, a humidity sensor and a door position sensor.

40. The method of claim 35, wherein the controller is also connected to a controlled device and whereas the acting upon the encoded request includes sending an electrical signal to the controlled device.

41. The method of claim 40, wherein the controlled device is selected from the group consisting of a lock system, a display, a light and an audible device.

42. The method of claim 35, wherein the locator device is affixed to a tamper resistant belt, bracelet or shackle.

43. A method for locating comprising:
sending a natural language request message from an originating device to a server, the originating device having an originating device address;
translating in the server the originating device address and natural language request message into a locator device address and an encoded request;
sending the encoded request from the server to a wireless network;
determining an approximate location of a locator device by the wireless network;
sending an encoded response back from the wireless network to the server;
translating in the server the encoded response into a natural language response message by the server; and
sending the natural language response message from the server to the originating device at the originating device address, wherein the locator device comprises at least a radio frequency transmitter.

44. The method of claim 43, wherein the wireless network uses a triangulation system to determine the approximate location.

45. The method of claim 43, wherein the at least a radio frequency transmitter is a wireless transceiver and a controller within the locator device is connected to the wireless transceiver, the controller is adapted to send and receive the short messages from and to the server through the wireless transceiver wherein the controller is also connected to a sensor and whereas the acting upon the encoded request includes reading a value from the sensor and where the encoded response includes the value.

46. The method of claim 45, wherein the sensor is selected from the group consisting of a thermal sensor, a pressure sensor, a speed sensor, a humidity sensor and a door position sensor.

47. The method of claim 45, wherein the controller is also connected to a controlled device and whereas the acting upon the encoded request includes sending an electrical signal to the controlled device.

48. The method of claim 47, wherein the controlled device is selected from the group consisting of a lock system, a display, a light and an audible device.

49. The method of claim 43, wherein the locator device is affixed to a tamper resistant belt, bracelet or shackle.

* * * * *